US010339462B2

(12) United States Patent
Kelly

(10) Patent No.: US 10,339,462 B2
(45) Date of Patent: Jul. 2, 2019

(54) SYSTEM AND METHOD FOR EXECUTING A HIGH BANDWIDTH NETWORK ACTIVITY AS A BACKGROUND ACTIVITY IN A VIRTUAL DESKTOP ENVIRONMENT

(71) Applicant: DELL PRODUCTS, LP, Round Rock, TX (US)

(72) Inventor: John Kelly, Limerick (IE)

(73) Assignee: Dell Products, LP, Round Rock, TX (US)

( * ) Notice: Subject to any disclaimer, the term of this patent is extended or adjusted under 35 U.S.C. 154(b) by 129 days.

(21) Appl. No.: 15/139,861

(22) Filed: Apr. 27, 2016

(65) Prior Publication Data

US 2017/0317940 A1 Nov. 2, 2017

(51) Int. Cl.
| | |
|---|---|
| G06N 7/00 | (2006.01) |
| H04L 12/26 | (2006.01) |
| G06N 20/00 | (2019.01) |
| H04L 12/851 | (2013.01) |
| H04L 12/833 | (2013.01) |
| H04L 12/24 | (2006.01) |

(52) U.S. Cl.
CPC ............. *G06N 7/005* (2013.01); *G06N 20/00* (2019.01); *H04L 41/0896* (2013.01); *H04L 43/0882* (2013.01); *H04L 43/16* (2013.01); *H04L 47/245* (2013.01); *H04L 47/2458* (2013.01)

(58) Field of Classification Search
CPC .............. H04L 47/2416; H04L 43/062; H04L 43/0882; H04L 47/25; H04L 43/16; G06N 7/005; G06N 99/005
See application file for complete search history.

(56) References Cited

U.S. PATENT DOCUMENTS

| | | | |
|---|---|---|---|
| 6,820,117 B1 | 11/2004 | Johnson | |
| 2007/0115848 A1 | 5/2007 | Chean et al. | |
| 2015/0326481 A1* | 11/2015 | Rector | ............... H04L 47/14 370/236 |

* cited by examiner

*Primary Examiner* — Pao Sinkantarakorn
*Assistant Examiner* — Kabir U Jahangir
(74) *Attorney, Agent, or Firm* — Larson Newman, LLP

(57) ABSTRACT

An information handling system includes a plurality of memories and a plurality of processors. Portions of the processors and the memories are allocated as a virtual machine to a second information handling system. During a learning phase, a first processor to monitors a high bandwidth network activity of the second information handling system, and stores an event associated with the high bandwidth network activity. During an operating phase, the first processor detects the event, and transfers data associated with the high bandwidth network activity as a background activity based on available bandwidth between the information handling system and the second information handling system.

19 Claims, 3 Drawing Sheets

SYSTEM AND METHOD FOR EXECUTING A HIGH BANDWIDTH NETWORK ACTIVITY AS A BACKGROUND ACTIVITY IN A VIRTUAL DESKTOP ENVIRONMENT

FIELD OF THE DISCLOSURE

This disclosure generally relates to information handling systems, and more particularly relates to executing a high bandwidth network activity as a background activity in a virtual desktop environment.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

An information handling system includes a plurality of memories and a plurality of processors. Portions of the processors and the memories are allocated as a virtual machine to a second information handling system. During a learning phase, a first processor monitors a high bandwidth network activity of the second information handling system, and stores an event associated with the high bandwidth network activity. During an operating phase, the first processor detects the event, and transfers data associated with the high bandwidth network activity as a background activity based on available bandwidth between the information handling system and the second information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
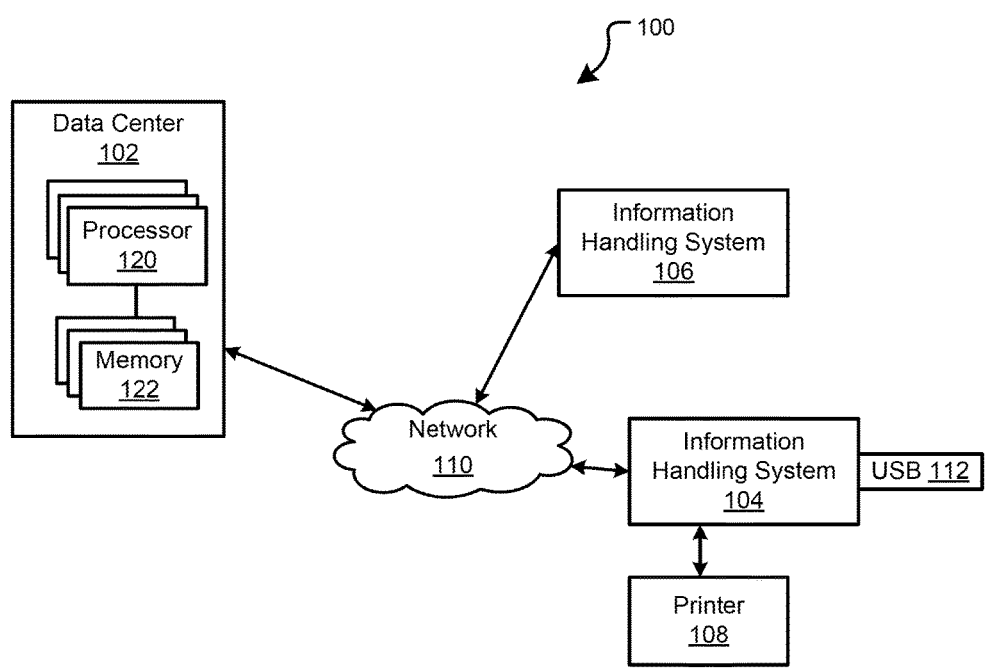
FIG. 1 is a block diagram of virtual desktop environment including an information handling system and a data center in accordance with at least one embodiment of the present disclosure.

FIG. 1 illustrates a virtual desktop environment 100 for one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The virtual desktop environment 100 includes an information handling system or data center 102, information handling systems 104 and 106, and printer 108. The information handling systems 104 and 106 can communicate with the data center 102 via a network 110. The data center 102 includes one or more processors 120 and one or more memories 122. In an embodiment, the data center 102 can operate as a backend for the virtual desktop environment 100, such that the data center can instantiate one or more virtual machines for thin client devices, such as information handling systems 104 and 106, in the virtual desktop environment 100. In this embodiment, the data center 102 can allocate different portions of the processors 120 and the memories 122 as the virtual machines for the information handling systems 104 and 106.

During operation, the processors 120 can execute different applications launched by users of the information handling systems 104 and 106, and the memories 122 can store data associated with these applications and other operations executed within the virtual desktop environment 100. In an embodiment, the information handling systems 104 and 106 can be substantially similar, such that the information handling systems can include the same components and operate in a similar manner. Therefore, for clarity and brevity the operation of the virtual desktop environment 100 will be discussed only with respect to information handling system 104.

In an embodiment, the available bandwidth between the information handling system 104 and the data center 102 via the network 110 can be limited, and in certain situations, such as when multiple other information handling systems are communicating with the data center 102 via network 110, this bandwidth can be relatively low. In these situations, the high bandwidth network activity can utilize all of the available bandwidth in network 110, and as a result the user experience of a user associated with the information handling system 104 can be impacted. For example, if a high bandwidth network activity performed by the information handling system 104 causes the entire available bandwidth to be used, and there will not be enough bandwidth for other activities/operations to be executed, such as high priority activities. In an embodiment, the high bandwidth network activity can be transferring a large file from the USB device 112 to the memory 122, printing a large data file from the data center 102 to the printer 108 connected to the information handling system 104, or the like. In an embodiment, high priority activities that should be executed without interruption, such as streaming real-time audio, streaming real-time video, display graphics, voice over Internet Protocol call, or the like, may be executed while the high bandwidth network activity is being executed in the virtual desktop environment 100.

One of the processors 120 in the data center 102 can monitor the activities between the data center 102 and the information handling systems 104 and 106, and can determine which activities/operations are high bandwidth network activities. The processor 120 can enter into a learning phase to determine analytics, such as events that precede high bandwidth network activities, for each of the high bandwidth activities. During this learning phase, the processor 120 can construct a hypothesis as to the likelihood of the relevant high bandwidth network activity occurring. For example, the processor 120 can implement the following pseudo code to determine analytics associated with a network printing from the data center 102 to the printer 108 coupled to the information handling system 104:

```
array tested_variables
BOOLEAN printing_occurred
ADD VARIABLE
define monitoring_interval <VALUE>
FOREACH ITEM IN tested_variables
    Record ITEM VALUE
    Record printing_occurred value
END FOREACH
IF (monitoring_interval elapsed)
    FOREACH ITEM IN tested_variables
        Implement correlation analysis
        Calculate correlation score
    END FOREACH
ENDIF
```

In an embodiment, the function "array tested_variables" can contain a list of variables which should be tested as to determine whether there is a correlation between the value of the variable and a likelihood of a printing event occurring from the data center 102 to the printer 108. For example, the tested variables can include a document name, document type, document location, or the like. In an embodiment, the document type can be a .pdf, .doc, or the like. The variable list can be a list of preset variables that can be dynamically adjusted by a user or by the processor 120. The instruction "ADD VARIABLE" enables the processor 120 to determine new variables that are associated with the high bandwidth network activity, to receive new variables, and to add these variables to the tested variable list.

In an embodiment, instruction "BOOLEAN printing_occured" can cause the processor 120 to store Boolean variable depending on whether a high bandwidth printing has occurred. In an embodiment, the value can be 1 or 0 depending on whether the printing occured. In an embodiment, the instruction "define monitoring_interval" can cause the processor 120 to set a duration of time after which an analysis is carried out as to the likelihood of the print operation occurring. For example, the monitoring interval can be set to twenty minutes, thirty minutes, forty-five minutes, or the like. The instruction "FOREACH ITEM IN test_variables" can start a loop of instructions that is implemented for each variable in the tested variables list described above.

The instruction "Record ITEM VALUE" can cause the processor 120 to store in memory 122 the item value for the variable from the variable list detected by the processor each time through the loop. The instruction "Record printing_occured value" can cause the processor 120 to store in memory 122 whether a high bandwidth print occurred after the detection of the variable. For example, the variable can be a .pdf document type is opened, and the processor 120 can store a value whether a high bandwidth print activity occurred between the data center 102 and the printer 108 after the .pdf document type was opened/detected. For example, the processor 120 can record whether the printing occurred at five minute intervals between five and thirty minutes after file opened. The instruction "END FOREACH" can cause the processor 120 to exit the FOREACH loop.

The instruction "IF(monitoring_interval_elapsed)" can cause the processor to execute another loop "FOREACH ITEM IN tested_variables" if the monitoring interval has ended. The instruction "Implement correlation analysis" can cause processor 120 to utilize a predictive analytics algorithm to anticipate when a high bandwidth print operation is going to be executed. In an embodiment, the processor 120 can use any type of predictive analytics algorithm, such as Pearson predictive analytics algorithm. The instruction "calculate correlation score" can cause the processor to correlate a likelihood of a high bandwidth printing occurring after a particular variable or event is detected. The instruction "END FOREACH" can end the loop, and the instruction "ENDIF" can end the 'if' statement.

The above pseudo code was described with respect to network printing of a large file from the data center 102 to the printer 108. However, the pseudo code can be equally relevant to other high bandwidth activities, such as copying data between the USB device 112 and the data center 102, scanning large documents from the information handling system 104 to the data center, or the like. For example, the processor 120 can determine that there is a high probability that data is transferred from the information handling system 104 to one of the memories 122 of the data center 102 within 15 minutes of a USB drive 112 being plugged into the information handling system 104.

The processor 120 can store information indicating the event or events that occur before a high bandwidth network activity, determined during the learning phase, as analytics for that high bandwidth network activity. For example, an event that the USB device 112 is plugged into the information handling system 104 can be defined as an analytic for the high bandwidth network activity of transferring data from the information handling system 104 to the data center 102. If the high bandwidth network activity is printing a large file, stored at the data center 102, on the printer 108, the opening of a particular type of file can be stored as an analytic for this type of high bandwidth network activity. The processor 120 can also store a percentage of the time that when one of the above described events is detected that a corresponding high bandwidth network activity is executed.

After the learning phase sets a first level of analytics, the processor 120 can enter into operate phase and the processor can utilized the stored analytics to determine whether a high bandwidth network activity is likely to occur. In an embodiment, the correlation calculation activities that occur during the learning phase can continue during operate phase, such that the value of the various correlations scores can be constantly updated, and background activities can be performed based on the most recent value of these scores. In response to the processor 120 detecting an event defined as an analytic for a high bandwidth network activity, the processor 120 can execute the associated high bandwidth network activity as a background activity. For example, in response to the processor 120 detecting one or more correlated events, such as a .pdf file being opened, associated with high bandwidth printing activity, the processor 120 can execute the following pseudo code to perform the high bandwidth printing activity as a background activity while high priority activities are executed:

```
define bandwidth_threshold
Monitor bandwidth_usage
WHILE (bandwidth_threshold NOT EXCEEDED)
    SEND RAW PRINT DATA FOR HIGHEST PRINTING
    CORRELATION FILE TO CLIENT-SIDE STAGING AREA
    PUSH NEXT HIGHEST PRINTING CORRELATION FILE TO
    TOP OF PRIORITY LIST
END
```

The instruction "define bandwidth_threshold" causes the processor 120 to define a threshold that the bandwidth is to remaining below, such as 75%, 80%, 85%, 90% or the like. The instruction "Monitor bandwidth_usage" can cause the processor 120 to monitor the bandwidth between the information handling system 104 and the data center 102, and the instruction "WHILE (bandwidth_threshold NOT EXCEEDED)" enables the processor 120 to execute the next two instructions while the bandwidth remains below the threshold value. For example, if the threshold value is 85%, then the processor 120 can send the raw print data for a highest printing correlation file to the information handling system 104, and then the next highest printing correlation file to the information handling system 104. Thus, the processor 120 can send the data for one or more high bandwidth printing activities in small blocks of data as a background activity while other operations or activities are being executed and while the bandwidth through the network 110 remains below 85% of capacity.

After the data is sent to the information handling system 104, the processor 120 waits until a user requests that the file be printed, and the processor 120 can then send a print request to the information handling system 104 without also having to send the data to be printed. The information handling system 104 can then send the print data that has already been stored in the information handling system to printer 108 without utilizing any of the bandwidth in the virtual desktop environment 100.

Similar code to that provided above can be utilized in performing a transfer of a large data file from the USB device 112 or the information handling system 104 to the memory 122 of the data center 102. In this situation, the copying can be performed based on available user bandwidth without impacting end-user experience, such as by ensuring that network utilization never reaches 85%. As a result of this advance background activity, when the user actually executes their desired high bandwidth network activity, such as printing a file to the printer 108, copying a file between the USB device 112 and the data center 102, much of that activity has already been completed during the advance background activity and the high bandwidth network activity can be completed in a reduced amount of time and with a reduced impact on end-user experience.

In an embodiment, the improved end-user experience can come in the form of either significantly less deterioration in performance of high-priority activities in a non-quality of service controlled environment, or significantly faster burst network activities in a quality of service controlled environment. Thus, prior detection of a bursty high bandwidth network activity can prove high quality end-user experience for both real-time high priority activities, such as real-time audio or video, and the bursty high bandwidth activities, such as printing or copy large data files.

Figure 2:
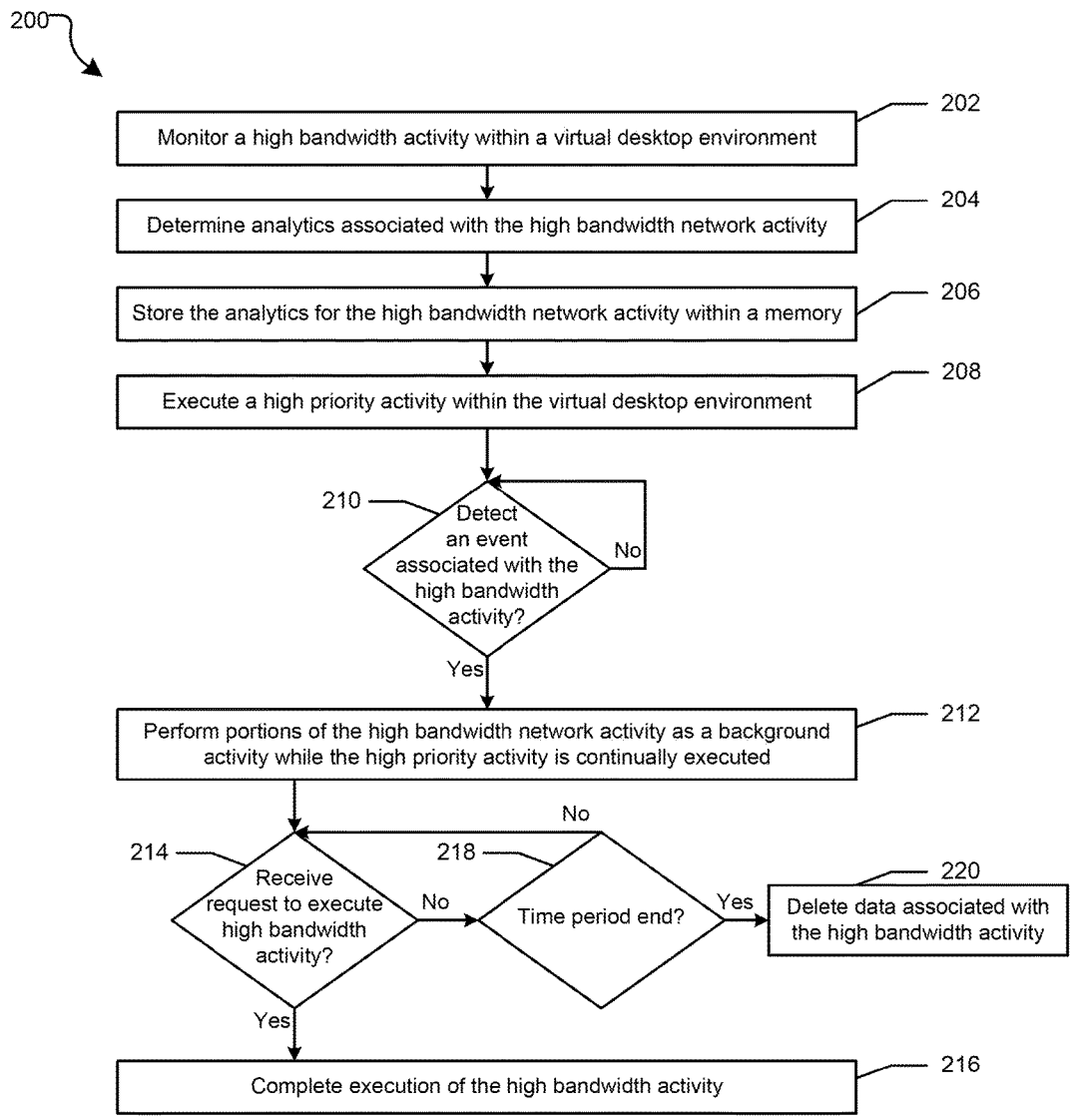
FIG. 2 is a flow diagram of a method for performing a high bandwidth network activity as a background activity in the virtual desktop environment in accordance with at least one embodiment of the present disclosure.

FIG. 2 is a flow diagram of a method 200 for performing a high bandwidth network activity as a background activity in the virtual desktop environment 100 in accordance with at least one embodiment of the present disclosure. At block 202, a high bandwidth network activity is monitored within the virtual desktop environment 100. In an embodiment, the high bandwidth network activity is monitored during a learning phase. In an embodiment, the high bandwidth network activity can be transferring a large file from a USB device connected to an information handling system across a network to a memory in a data center, printing a large data file from the data center to a printer connected to the information handling system, or the like. In an embodiment, the network can have a limited bandwidth. Analytics associated with the high bandwidth network activity are determined at block 204.

At block 206 the analytics for the high bandwidth network activity are stored within a memory. In an embodiment, the memory can be located with the data center of a backend of the virtual desktop environment 100. A high priority activity is executed within the virtual desktop environment at block 208. In an embodiment, high priority activities are activities that should be executed without interruption, such as streaming real-time audio, streaming real-time video, display graphics, voice over Internet Protocol call, or the like. At block 210, a determination is made whether an event associated with a high bandwidth network activity is detected. In an embodiment, this determination can be made while the high priority activity is being executed. When the event is detected, portions of the high bandwidth network activity are performed as background activities while the high priority activity is continually being executed at block 212. At block 214, a determination is made whether a request to execute the high bandwidth network activity is received.

If the request to execute the high bandwidth network activity is received, the execution of the high bandwidth network activity is completed at block 216. However, if the request to execute the high bandwidth network activity is not received, a determination is made whether a time period has expired at block 218. If the time period has not expired the flow continues as described above at block 214, otherwise if the time period has expired any stored data associated with the high bandwidth network activity is deleted at block 220.

Figure 3:
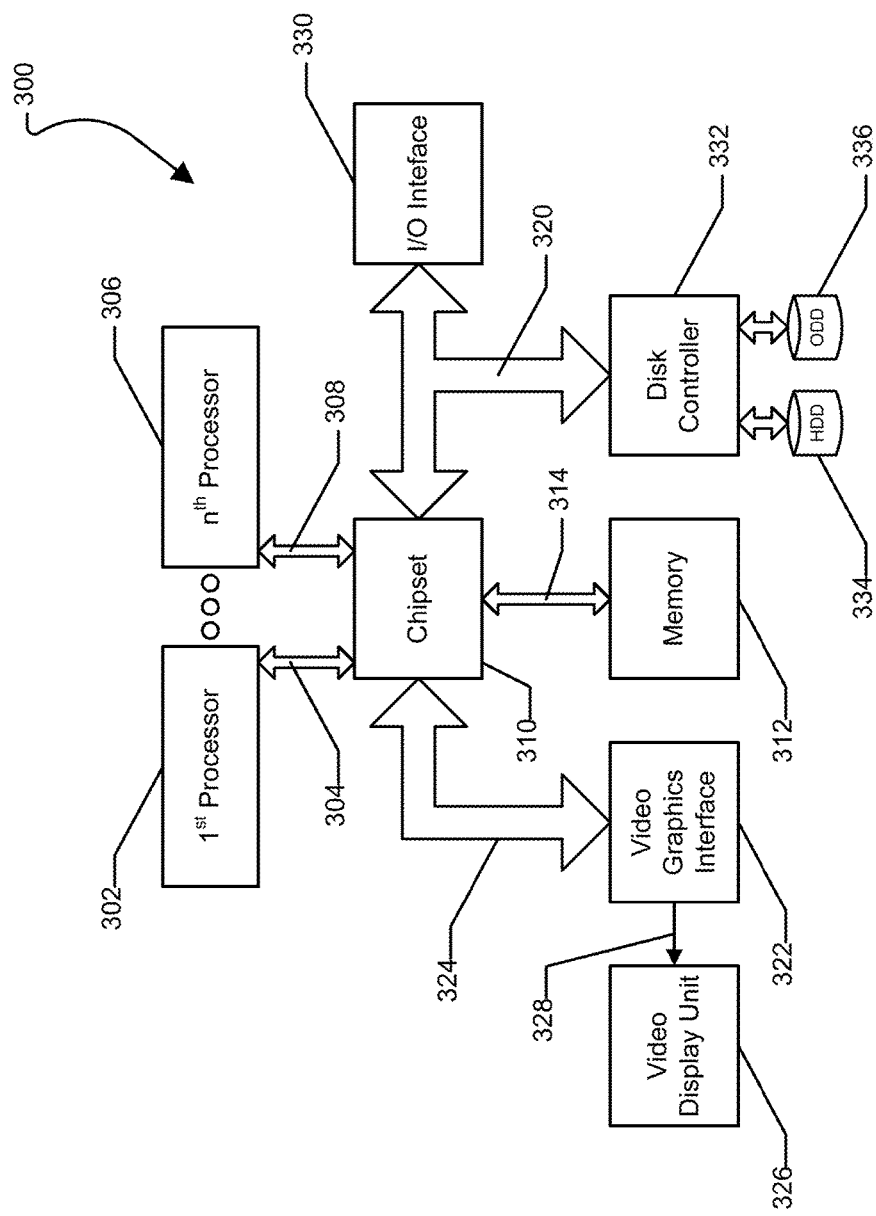
FIG. 3 is a block diagram of a general information handling system.

As shown in FIG. 3, an information handling system 300, such as the data center 102, the information handling system 104, or the information handling system 106, can include a first physical processor 302 coupled to a first host bus 304 and can further include additional processors generally designated as $n^{th}$ physical processor 306 coupled to a second host bus 308. The first physical processor 302 can be coupled to a chipset 310 via the first host bus 304. Further, the $n^{th}$ physical processor 306 can be coupled to the chipset 310 via the second host bus 308. The chipset 310 can support multiple processors and can allow for simultaneous processing of multiple processors and support the exchange of information within information handling system 300 during multiple processing operations.

According to one aspect, the chipset 310 can be referred to as a memory hub or a memory controller. For example, the chipset 310 can include an Accelerated Hub Architecture (AHA) that uses a dedicated bus to transfer data between first physical processor 302 and the $n^{th}$ physical processor 306. For example, the chipset 310, including an AHA enabled-chipset, can include a memory controller hub and an input/output (I/O) controller hub. As a memory controller hub, the chipset 310 can function to provide access to first physical processor 302 using first bus 304 and $n^{th}$ physical processor 306 using the second host bus 308. The chipset 310 can also provide a memory interface for accessing memory 312 using a memory bus 314. In a particular embodiment, the buses 304, 308, and 314 can be individual buses or part of the same bus. The chipset 310 can also provide bus control and can handle transfers between the buses 304, 308, and 314.

According to another aspect, the chipset 310 can be generally considered an application specific chipset that provides connectivity to various buses, and integrates other system functions. For example, the chipset 310 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 310. The chipset 310 can also be packaged as an application specific integrated circuit (ASIC).

The information handling system 300 can also include a video graphics interface 322 that can be coupled to the chipset 310 using a third host bus 324. In one form, the video graphics interface 322 can be an Accelerated Graphics Port (AGP) interface to display content within a video display unit 326. Other graphics interfaces may also be used. The video graphics interface 322 can provide a video display output 328 to the video display unit 326. The video display unit 326 can include one or more types of video displays such as a flat panel display (FPD) or other type of display device.

The information handling system 300 can also include an I/O interface 330 that can be connected via an I/O bus 320 to the chipset 310. The I/O interface 330 and I/O bus 320 can include industry standard buses or proprietary buses and respective interfaces or controllers. For example, the I/O bus 320 can also include a Peripheral Component Interconnect (PCI) bus or a high speed PCI-Express bus. In one embodiment, a PCI bus can be operated at approximately 33 MHz and a PCI-Express bus can be operated at more than one speed, such as 2.5 GHz, 5 GHz, 8 GHz, and 16 GHz. PCI buses and PCI-Express buses can be provided to comply with industry standards for connecting and communicating between various PCI-enabled hardware devices. Other buses can also be provided in association with, or independent of, the I/O bus 320 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 310 can be a chipset employing a Northbridge/Southbridge chipset configuration (not illustrated). For example, a Northbridge portion of the chipset 310 can communicate with the first physical processor 302 and can control interaction with the memory 312, the I/O bus 320 that can be operable as a PCI bus, and activities for the video graphics interface 322. The Northbridge portion can also communicate with the first physical processor 302 using first bus 304 and the second bus 308 coupled to the $n^{th}$ physical processor 306. The chipset 310 can also include a Southbridge portion (not illustrated) of the chipset 310 and can handle I/O functions of the chipset 310. The Southbridge portion can manage the basic forms of I/O such as Universal Serial Bus (USB), serial I/O, audio outputs, Integrated Drive Electronics (IDE), and ISA I/O for the information handling system 300.

The information handling system 300 can further include a disk controller 332 coupled to the I/O bus 320, and connecting one or more internal disk drives such as a hard disk drive (HDD) 334 and an optical disk drive (ODD) 336 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 310, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a plurality of memories; and
   a plurality of processors including a first processor, portions of the processors and the memories being allocatable as a virtual machine to a second information handling system, the first processor to monitor a high bandwidth network activity of the second information handling system during a learning phase, to store an event associated with the high bandwidth network activity, to detect whether the high bandwidth network activity is executed at set intervals after the event is detected during the learning phase, to detect the event during an operating phase, to determine based upon a predictive analytics algorithm a correlation score that the event predicts the occurrence of high bandwidth network activity, and to transfer data associated with the high bandwidth network activity as a background activity based on available bandwidth between the information handling system and the second information handling system and on the correlation score;
wherein the event comprises one of plugging a USB device into the second information handling system and printing a file from the information handling system to the second information handling system.

2. The information handling system of claim 1 the first processor to set a bandwidth threshold limit while the data is transferred as the background activity.

3. The information handling system of claim 1 wherein other activities are given higher priority to utilize the available bandwidth while the data is transferred as the background activity.

4. The information handling system of claim 1 the processor, during the learning phase, to determine other events associated with the high bandwidth network activity, and to store the events as analytics for the high bandwidth network activity.

5. The information handling system of claim 4 the processor, during the learning phase, to correlate each of the events with the high bandwidth network activity to determine a probability that the high bandwidth activity is to be executed after detection of one of the events.

6. The information handling system of claim 1 wherein the event is a file having a particular file type is opened.

7. A method comprising:
allocating portions of a plurality of processors and a plurality of memories in a first information handling system as a virtual machine to a second information handling system;
during a learning phase:
monitoring, by a first processor of the processors, a high bandwidth network activity of the second information handling system;
detecting an event that precedes the high bandwidth network activity, wherein the event is an operation other than a data transfer; and
storing, by the first processor, the event associated with the high bandwidth network activity; and
during an operating phase:
detecting the event;
determining based upon a predictive analytics algorithm a correlation score that the event predicts the occurrence of high bandwidth network activity; and
transferring, by the first processor, data associated with the high bandwidth network activity as a background activity based on available bandwidth between the information handling system and the second information handling system and on the correlation score;
wherein the event comprises one of plugging a USB device into the second information handling system and printing a file from the information handling system to the second information handling system.

8. The method of claim 7 further comprising:
setting a bandwidth threshold limit while the data is transferred as the background activity.

9. The method of claim 7 wherein other activities are given higher priority to utilize the available bandwidth while the data is transferred as the background activity.

10. The method of claim 7 further comprising:
detecting, during the learning phase, whether the high bandwidth network activity is executed at set intervals after the event is detected.

11. The method of claim 7 further comprising:
determining, during the learning phase, other events associated with the high bandwidth network activity, and to store the events as analytics for the high bandwidth network activity.

12. The method of claim 11 further comprising:
correlating, during the learning phase, each of the events with the high bandwidth network activity to determine a probability that the high bandwidth activity is to be executed after detection of one of the events.

13. The method of claim 7 wherein the event is a file having a particular file type is opened.

14. A method comprising:
monitoring, by a processor, a high bandwidth network activity;
storing, by the processor, analytics associated with the high bandwidth network activity;
executing a high priority activity, wherein the high priority activity is a different activity than the high bandwidth network activity;
detecting that the high bandwidth network activity is to be executed;
determining based upon a predictive analytics algorithm a correlation score that the event predicts the occurrence of high bandwidth network activity; and
transferring, by the processor, data associated with the high bandwidth network activity as a background activity based on available user bandwidth in preparation for a request to execute the high bandwidth network activity and on the correlation score;
wherein the event comprises one of plugging a USB device into the second information handling system and printing a file from the information handling system to the second information handling system.

15. The method of claim 14 wherein detecting that the high bandwidth network activity is to be executed comprises:
detecting an event associate with the high bandwidth network activity.

16. The method of claim 15 wherein the event is a universal serial bus drive being plugged into a thin client.

17. The method of claim 15 further comprising:
associating the event with the high bandwidth network activity based on the stored analytics.

18. The method of claim 14 wherein the analytics indicate that a particular event precedes the execution of the high bandwidth network activity.

19. The method of claim 14 further comprising:
receiving the request to execute the high bandwidth network activity after the data has been transferred as a background activity; and
executing the high bandwidth network activity without utilizing an entire available bandwidth.

* * * * *